No. 843,926. PATENTED FEB. 12, 1907.
P. BRASHER.
PROTECTING OBJECTS FROM WAVE ACTION.
APPLICATION FILED NOV. 22, 1906.
Fig. 1
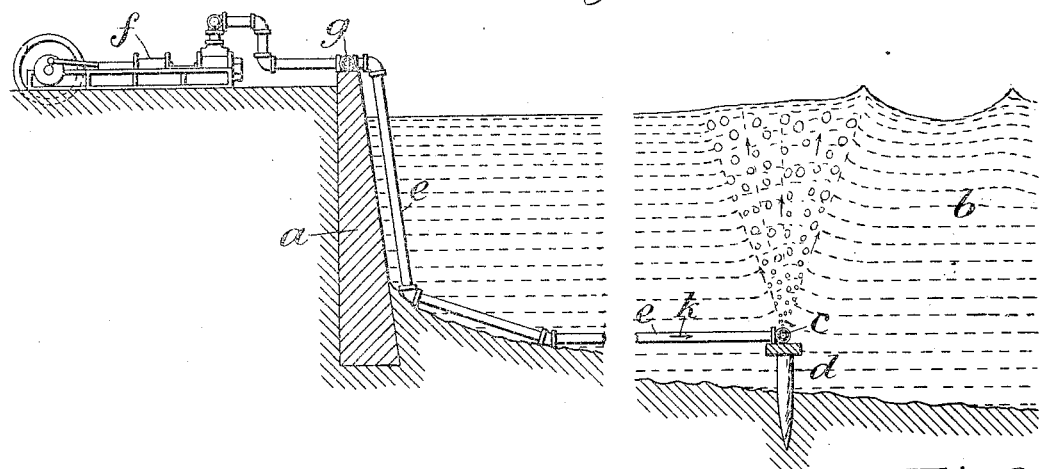
Fig. 4    Fig. 5    Fig. 3    Fig. 2
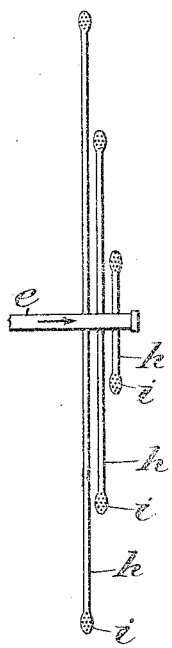 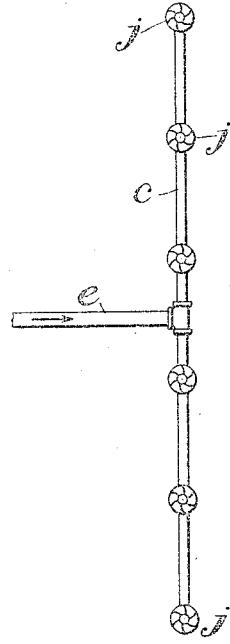 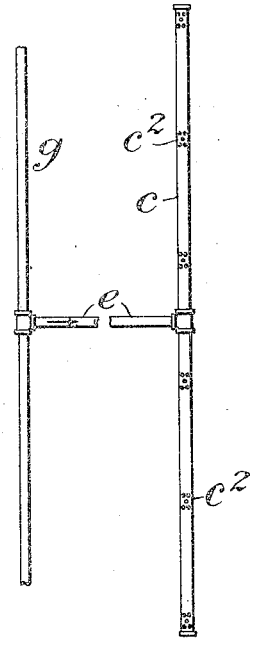 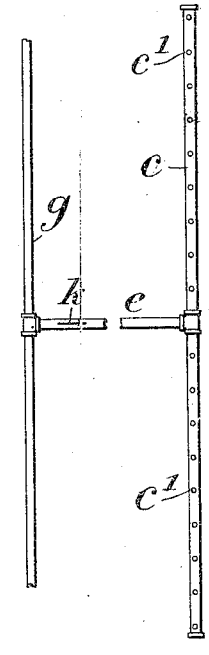
Witnesses:
Wm. A. Kelly
Albert H. Day
Inventor:
Philip Brasher
by Henry D. Williams
Atty

UNITED STATES PATENT OFFICE.

PHILIP BRASHER, OF NEW YORK, N. Y.

PROTECTING OBJECTS FROM WAVE ACTION.

No. 843,926.                Specification of Letters Patent.                Patented Feb. 12, 1907.

Application filed November 22, 1906. Serial No. 344,558.

*To all whom it may concern:*

Be it known that I, PHILIP BRASHER, a citizen of the United States, residing in the borough of Brooklyn, city of New York, in the county of Kings and State of New York, have invented certain new and useful Improvements in Protecting Objects from Wave Action, of which the following is a specification, reference being had therein to the accompanying drawings, forming a part thereof.

My invention relates to the protection of objects from the action of the waves of the ocean or other bodies of water, and has for its objects the protection of beaches, bulkheads, piers, light-houses, and other objects or structures exposed to wave action and the protection of light-ships and other vessels and the protection of harbors and the formation of artificial harbors.

My invention includes a new method of effecting such protection and also includes improved means whereby such new method may be effectively employed.

I have found that by discharging a compressed elastic fluid, such as air, beneath the surface of the water at a substantial distance from the object to be protected I can effect a substantially complete destruction of the waves, so that the waves approaching an object will be substantially annihilated by the wave-destroying action of the rising globules or bubbles or columns of expanding elastic fluid and the object effectively shielded or protected from wave action. In using this new method of protection from wave action I may employ a wide variety of means adapted to various conditions of use, and these means are generically of novel construction, and several varieties thereof are shown in the drawings and hereinafter described, and a single species thereof is hereinafter claimed.

I will now describe the means embodying my invention illustrated in the accompanying drawings and will thereafter point out my invention in claims.

Figure 1 is a vertical sectional elevation or profile showing means embodying my invention applied to the protection of a bulkhead. Fig. 2 is a plan view of the compressed-air conveying and discharging apparatus shown in Fig. 1. Figs. 3, 4, and 5 are similar views of modifications thereof.

In Fig. 1 the bulkhead $a$ is protected from the action of the waves of the body of water $b$ by the discharge of compressed air from the pipe $c$. This pipe $c$ is supported upon a pile-supported frame $d$ at a substantial distance from the bulkhead—in the neighborhood of one hundred feet—and may be about fifteen feet below the surface of the water. The depth of the location of the discharge-pipe $c$ should be such as to insure its substantial immersion at all stages of the tide and in all conditions of the water. Preferably the discharge-pipe should be always below the plane of disturbance of the water by surface waves.

The discharge-pipe is shown as provided with a line of discharge-openings $c'$ (see Fig. 2) along its upper surface, so that the compressed air is discharged in an upward direction. It receives its supply of compressed air from a feed-pipe $e$, and this feed-pipe runs from a main $g$ on the shore, designed to supply compressed air to a number of discharge-pipes, such as $c$, arranged in alinement and of such a total length as to provide protection to the desired length of water-front. The main $g$ receives compressed air from a suitable source thereof, shown as an air-compressor $f$.

In the modification shown in Fig. 3 the discharge-pipe is shown as provided with groups of discharge-openings $c^2$ instead of with a line of such openings. The action in each instance would be substantially the same.

In the modification shown in Fig. 4 a plurality of parallel discharge-pipes $h$ of different lengths extend from the feed-pipe and are supplied with compressed air from the feed-pipe, each discharge-pipe terminating in a perforated discharge-head $i$, through which the compressed air is discharged. In this construction each discharge-head is supplied independently by an individual discharge-pipe of the proper capacity.

In the modification shown in Fig. 5 the discharge-pipe is provided with turbines $j$, through which the compressed air is upwardly discharged, the escaping air acting to rotate the turbines and the turbines acting to break up the air into bubbles and then to circularly or circumferentially distribute the bubbles.

The direction of the flow of compressed air is indicated by the arrow $k$ at the feed-pipe $e$.

While I have shown the discharge-pipe $c$ as stationarily supported and have shown the source of compressed air as located upon the shore, it is perfectly evident that other means may be employed for supporting these parts for the protection of any object from the action of waves as coming fully within the principle and scope of my invention.

I claim—

1. The method of protecting objects from the action of water-waves which consists in discharging a compressed elastic fluid below the surface of the water between the object and the approaching waves and at a substantial distance from the object.

2. The method of protecting objects from the action of water-waves which consists in discharging compressed air below the surface of the water between the object and the approaching waves and at a substantial distance from the object.

3. The method of protecting objects from the action of water-waves which consists in discharging a compressed elastic fluid below the surface of the water between the object and the approaching waves and at a substantial distance from the object and at a depth below the disturbance of the water by surface waves.

4. The method of protecting objects from the action of water-waves which consists in discharging compressed air below the surface of the water between the object and the approaching waves and at a substantial distance from the object and at a depth below the disturbance of the water by surface waves.

5. Means for protecting objects from the action of water-waves comprising a conduit immersed between the object and the approaching waves and at a substantial distance from the object and having a plurality of discharge-openings therein, and means for supplying the conduit with a compressed elastic fluid.

6. Means for protecting objects from the action of water-waves comprising a conduit immersed between the object and the approaching waves and at a substantial distance from the object and at a depth below the disturbance of the water by surface waves and having a plurality of discharge-openings therein, and means for supplying the conduit with a compressed elastic fluid.

7. Means for protecting objects from the action of water-waves comprising a conduit immersed between the object and the approaching waves and at a substantial distance from the object and having a plurality of discharge-openings therein, and an air-compressor for supplying the conduit with compressed air.

8. Means for protecting objects from the action of water-waves comprising a conduit immersed between the object and the approaching waves and at a substantial distance from the object and at a depth below the disturbance of the water by surface waves and having a plurality of discharge-openings therein, and an air-compressor for supplying the conduit with compressed air.

9. Means for protecting objects from the action of water-waves comprising a conduit immersed between the object and the approaching waves and at a substantial distance from the object and having a line of discharge-openings along its upper surface, and means for supplying the conduit with a compressed elastic fluid.

10. Means for protecting objects from the action of water-waves comprising a conduit immersed between the object and the approaching waves and at a substantial distance from the object and at a depth below the disturbance of the water by surface waves and having a line of discharge-openings along its upper surface, and means for supplying the conduit with a compressed elastic fluid.

11. Means for protecting objects from the action of water-waves comprising a conduit immersed between the object and the approaching waves and at a substantial distance from the object and having a plurality of discharge-openings therein, means for supplying the conduit with a compressed elastic fluid, and means for breaking up the discharged fluid into bubbles and for scattering the bubbles.

12. Means for protecting objects from the action of water-waves comprising a conduit immersed between the object and the approaching waves and at a substantial distance from the object and at a depth below the disturbance of the water by surface waves and having a plurality of discharge-openings therein, means for supplying the conduit with a compressed elastic fluid, and means for breaking up the discharged fluid into bubbles and for scattering the bubbles.

13. Means for protecting objects from the action of water-waves comprising a conduit immersed between the object and the approaching waves and at a substantial distance from the object and having a line of discharge-openings along its upper surface, means for supplying the conduit with a compressed elastic fluid, and combined fluid-subdividing and fluid-scattering rotary elements for the conduit.

14. Means for protecting objects from the action of water-waves comprising a conduit immersed between the object and the approaching waves and at a substantial distance from the object and at a depth below the disturbance of the water by surface waves and having a line of discharge-openings along its upper surface, means for supplying the conduit with a compressed elastic fluid, and combined fluid-subdividing and fluid-scattering rotary elements for the conduit.

15. Means for protecting objects from the action of water-waves comprising a conduit immersed between the object and the approaching waves and at a substantial distance from the object and having a line of discharge-openings along its upper surface, means for supplying the conduit with a compressed elastic fluid, and turbines rotated by the discharging fluid for distributing the fluid.

16. Means for protecting objects from the action of water-waves comprising a conduit immersed between the object and the approaching waves and at a substantial distance from the object and at a depth below the disturbance of the water by surface waves and having a line of discharge-openings along its upper surface, means for supplying the conduit with a compressed elastic fluid, and turbines rotated by the discharging fluid for distributing the fluid.

In testimony whereof I have affixed my signature in presence of two witnesses.

PHILIP BRASHER.

Witnesses:
  HENRY D. WILLIAMS,
  BERNARD COWEN.